United States Patent
Sundareswaran et al.

(10) Patent No.: US 8,612,915 B1
(45) Date of Patent: Dec. 17, 2013

(54) REDUCING LEAKAGE IN STANDARD CELLS

(75) Inventors: Savithri Sundareswaran, Austin, TX (US); Robert L. Maziasz, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/606,858

(22) Filed: Sep. 7, 2012

(51) Int. Cl.
*G06F 17/50* (2006.01)

(52) U.S. Cl.
USPC .......................................................... 716/122

(58) Field of Classification Search
USPC .......................................................... 716/122
See application file for complete search history.

(56) References Cited

U.S. PATENT DOCUMENTS

| | | | | |
|---|---|---|---|---|
| 2004/0243946 A1* | 12/2004 | Gandhi | ............................. | 716/1 |
| 2010/0169846 A1* | 7/2010 | Gupta et al. | ...................... | 716/2 |
| 2010/0169847 A1* | 7/2010 | Gupta et al. | ...................... | 716/2 |
| 2011/0179391 A1* | 7/2011 | Culp et al. | ...................... | 716/50 |

* cited by examiner

*Primary Examiner* — Thuan Do
*Assistant Examiner* — Mohammed Alam
(74) *Attorney, Agent, or Firm* — Sprinkle IP Law Group

(57) ABSTRACT

Embodiments of systems and methods for leakage reduction of a cell are presented herein. According to one embodiment, a path module can identify each rail-to-rail path in a cell. In the embodiment, a transistor set module can select one or more transistors that are coupled to a rail of the cell and, if removed, no rail-to-rail path would exist in the cell. A layout modification module can transform the cell by upsizing a gate length of each transistor of the selected transistors to create a low-leakage version of the cell.

20 Claims, 5 Drawing Sheets

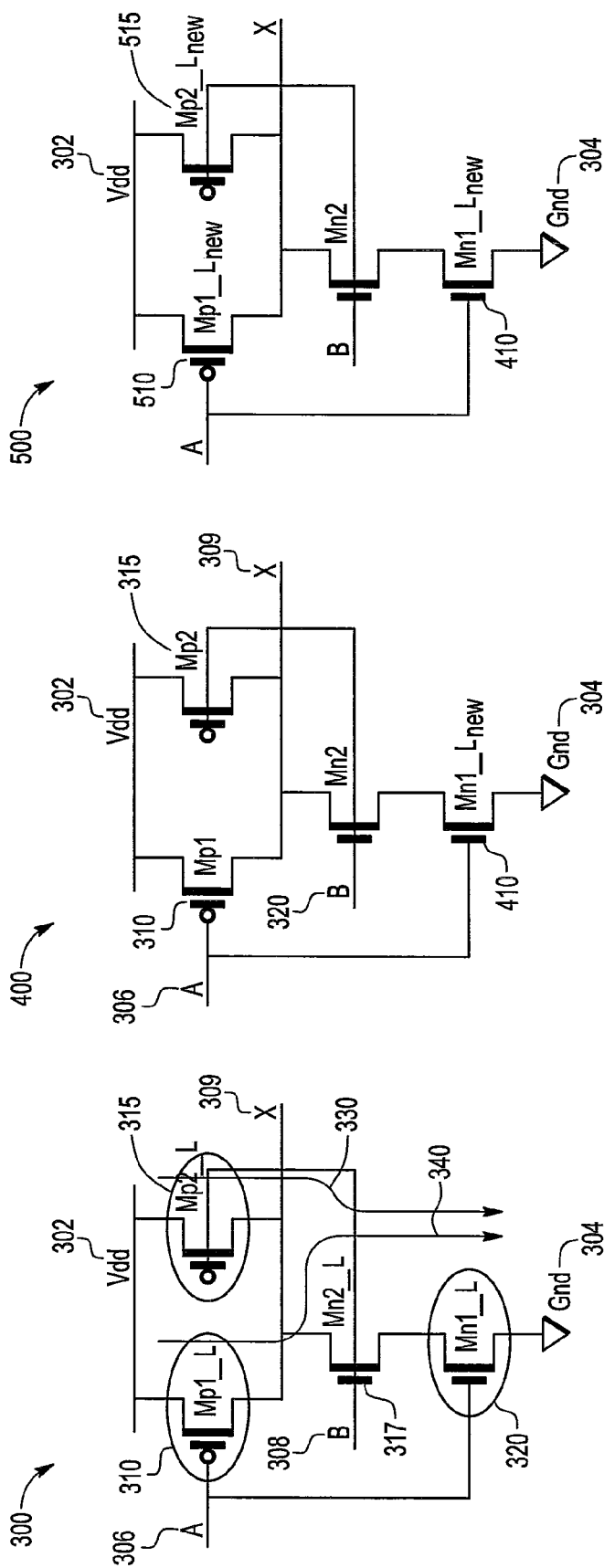

REDUCING LEAKAGE IN STANDARD CELLS

FIELD

This disclosure relates generally to reducing leakage in standard cells.

BACKGROUND

In many new integrated circuits leakage of transistors is becoming an increasing contributor to total power consumption of the circuits. Leakage of transistors is the drawing of unnecessary current from the supply during operation of the circuits or when the circuits are in standby mode. There are several sources of leakage including sub-threshold leakage, leakage due to gate-induced barrier lowering, gate-tunneling leakage, etc.

Leakage of transistors within cells may cause a number of problems, including, for example, contributing to improper functioning of the circuit or yield loss. Thus, it is desired to reduce the leakage of cells. Conventionally there are two methods to create low-leakage versions of cells. In one method, each transistor in a cell may be upsized by extending a gate length of the transistor. In another method, one or more transistors in the cell may have a higher-threshold voltage compared to a nominal threshold voltage for a process technology with which the cell is being utilized. These methods may, however, cause significant performance penalties such as higher delays, increased size of the cell or an increase in the switching power of the cell.

BRIEF DESCRIPTION OF THE DRAWINGS

Present example embodiments are illustrated by way of example and are not limited by the accompanying figures, in which like references indicate similar elements. Elements in the figures are illustrated for simplicity and clarity and have not necessarily been drawn to scale.

FIG. 3 illustrates the creation of a low-leakage version of an example cell according to one embodiment.

FIG. 4 illustrates the creation of a low-leakage version of an example cell according to one embodiment.

FIG. 5 illustrates the creation of a low-leakage version of an example cell according to one embodiment.

DETAILED DESCRIPTION

Figure 1:
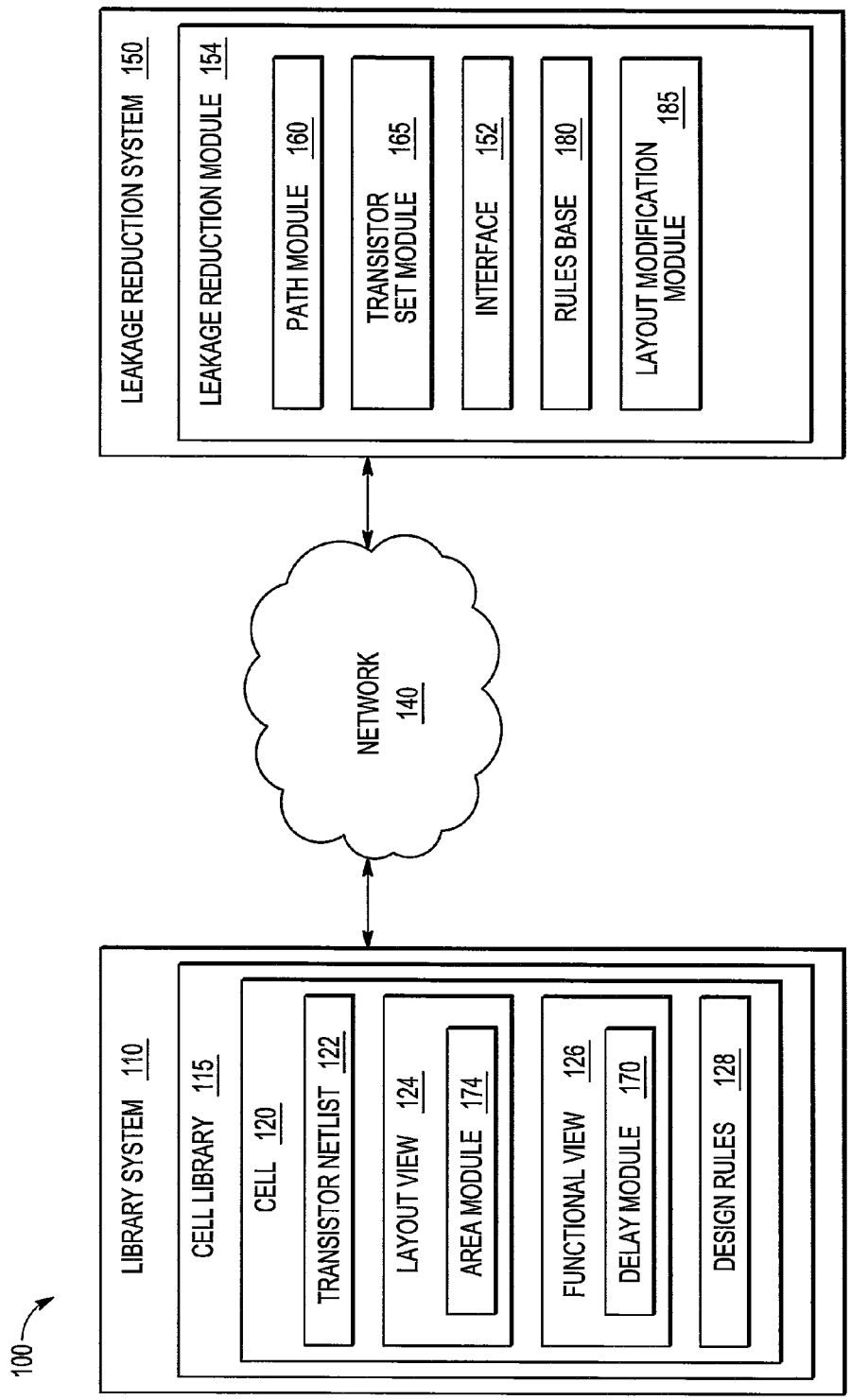
FIG. 1 illustrates one embodiment of a system for creating a low-leakage version of a cell.

Standard cells (referred to herein after as "cells") are the basic building blocks for creating integrated circuits, processors and system-on-a-chip when using computer-aided design tools. A cell can include a set of transistors and an interconnect structure for a logical function, such as for example, an adder function, a NAND function or an INVERT function. A cell library can have a number of cells associated with different logical functions and that conform to a common template and an associated process technology. The cells of a library can thus be utilized to design circuits conforming to the process technology.

Each of these cells may have a certain amount of current leakage. Leakage has undesirable consequences, such as impacting the functioning of adjacent circuitry and thereby increasing yield loss associated with the designed circuit. Thus, it is desired to reduce the leakage of a cell. One method for reducing leakage in cells is increasing the threshold voltage of transistors within the cell. This technique is problematic as it can increase the delay of the cell and cause problems when utilizing the cell in timing critical paths of a circuit design. Another method for reducing cell leakage is to upsize the transistors of the cell. Upsizing a transistor includes, for example, increasing a gate length of the transistor. This technique may be problematic as the area of the cell will increase. This increase is generally unacceptable as the area budgets for circuit design are increasingly small.

Embodiments as presented herein provide a leakage reducing system configured to create a design rule compliant low-leakage version of a cell that conforms to a set of criteria, including, for example an area budget or a delay budget. Embodiments as presented herein can thus address concerns in the creation of low-leakage version of cells, among others, and create cells that have reduced leakage while minimizing the impact on the delay or area of the cell.

Embodiments of the leakage reduction system evaluate a cell to select a subset of transistors of the cell to upsize. This selected set of transistors can be a minimum set of transistors, where this minimum set of transistors is the minimum number of transistors that are coupled to a rail of the cell and, if removed, no rail-to-rail path would exist in the cell. This selected set of transistors can be upsized a certain delta gate-length to create a version of the cell. This version of the cell can be checked for design rule compliance and adherence to one or more criteria such as an area budget or a delay budget. If the version of the cell is not compliant with the design rule or does not adhere to the budget criteria, it can be determined that a low-leakage version of the cell cannot be created. If, however, the version of the cell is compliant with the design rule and adheres to the budget criteria this version can be stored as a low-leakage version of the cell.

Alternatively, in other embodiments, an iterative process can be used to determine a number of transistors to modify to generate a low-leakage version of a cell. More transistors can be added to the set of transistors to upsize or the delta-gate-length ($\Delta L$) of the transistors can be increased. The set of transistors of the cell can then be upsized by a delta-gate-length to create the new version of the cell. The new version of the cell can then be checked as described above. This process can be iterated until the version of the cell being checked is not compliant with the design rules or does not adhere to the criteria, at which point a low-leakage version of the cell can be determined to be the previous version of the cell that was design rule compliant and adhered to the one or more criteria such as an area budget or a delay budget.

Accordingly, a low-leakage version of a cell can be created where the low-leakage version of the cell can adhere to certain criteria such as an area budget or a delay budget while still minimizing leakage. Such a low-leakage version of the cell reduces leakage with a minimal impact on the area or the delay of the cell. Moreover, such a low leakage version of the cell can be stored in a library and utilized across different designs. Thus, a circuit embodying the low-leakage version of the cell can be created. In addition, by creating low-leakage versions of all the cells within a library, a low-leakage version of a library can be created, and this low-leakage version of the library can be used in the creation of multiple circuit designs.

Referring now to FIG. 1, a block diagram of a system 100 that creates low-leakage versions of cells is depicted. System 100 is one or more subsystems that may include library system 110 and leakage reducing system 150 that can communicate over network 140, which can be an electronic communication network such as the ethernet, an internet, a LAN a WAN or another type of network.

Library system 110 can be a computer or storage unit including cell library 115. Cell library 115 can include cell 120. Although only one cell library 115 and one cell 120 is depicted for purposes of illustration, one skilled in the art will understand that a plurality of cells 120 can be included within cell library 115 and that a plurality of cell libraries 115 can exist on library system 110.

Cell 120 is a set of transistors and an interconnect structure that performs a logical function (e.g., AND, NAND, INVERTER, OR, adder, flip-flop, etc.). Each cell 120 in a cell library 115 can have a common template for the description of the cell 120 such that each cell 120 can be stored in a uniform manner and can be associated with a process technology.

Each cell 120 can include a number of different views, where each view of a cell 120 represents information about that cell 120. These views can include, for example, transistor netlist 122, layout view 124, and functional view 126. Cell 120 also includes one or more design rules 128 that can be utilized in performing design rule checking.

Transistor netlist 122 can be a schematic view of transistors within cell 120 including their connections to each other, power sources, ground and/or external environments. Layout view 124 can be a description of geometric characteristics of the transistors within a cell 120. Layout view 124 can either be created by a user determining the placement of transistors relative to one another, or layout view 124 can be determined by a tool or program that can determine transistors placement. In one embodiment, layout view 124 can be created using a GDSII database. Layout view 124 can include an area module 174 for the cell 120 identifying an area or size of cell 120.

Functional view 126 can be an abstraction of the characteristics associated with the transistor netlist 122 and layout view 124 representing functional metrics associated with the cell 120. Functional view 126 can include parameters describing the delay of cell 120 in delay module 170 or the leakage of cell 120. A functional view 126 could be derived, for example, from a circuit level simulation based on transistor netlist 122.

As discussed above cell 120 can have a certain amount of leakage. Leakage results in undesirable consequences, such as impacting the functioning of adjacent circuitry and thereby increasing yield loss associated with a circuit that includes the cell 120. Thus, it is desired to create a low-leakage version of cell 120. Leakage reduction system 150 is configured to create just such a low-leakage version of cell 120.

Leakage reduction system 150 includes leakage reduction module 154 configured to create a low-leakage version of a cell. Leakage reduction module 154 includes interface 152 through which a cell 120 can be received and through which a low-leakage version of the cell can be stored or provided to the library system 110 for storage in the cell library 115. Accordingly, cell 120 can be communicated from the library system 110 to the leakage reduction system 150 via network 140 such that the cell is received at the leakage reduction module 154 through interface 152. Cell 120 can also be communicated to leakage reduction system 150 through other techniques, such as a computer readable medium or the like.

Leakage reduction module 154 includes, path module 160, transistor set module 165, layout modification module 185 and rules base 180. Rules base 180 is a set of rules that can be used to determine which transistors should be included in a minimum set of transistors or to determine more transistors to upsize. Rules base 180 can include rules to determine the minimum set of transistors that will have the greatest effect on reducing leakage within the cell while minimally increasing the area of a cell. In one embodiment, rules within rules base 180 can include rules for determining a minimum number of transistors that cover each rail to rail path in a cell, transistors that are coupled to a rail, transistors that are closest to a rail, and transistors that are furthest away from an output.

For example, in one embodiment, a rule of rules base 180 can indicate that a minimum set of transistors that covers all rail-to-rail paths in a cell is the minimum number of transistors that are coupled to a rail and, if removed, would result in no rail-to-rail path existing in the cell. Another rule can indicate that if multiple transistors can be selected, where the removal of one of those transistors would remove the same rail-to-rail path(s) from the cell, the transistor with the higher leakage reduction for a gate upsize step should be selected.

Another rule of rules base 180 can be used to determine additional transistors to upsize. Such a rule can indicate that transistors that are closest to a rail (i.e. a transistor with the fewest intervening components between the transistor and the rail) or a transistor that is furthest away from an output (i.e. has the most intervening components between the transistor and the output) should be selected as additional transistors to upsize.

Rules base 180 can also include rules defining criteria, such as an area budget or a delay budget. Such rules can be configured by a user (for example, using interface 152) before a low-leakage version of a cell is created, can be associated with a particular process technology, or can be established in some other manner. An area budget or a delay budget can be specified as a percentage change, an absolute change, or in another manner entirely. Other rules in rules base 180 can include rules defining a gate upsize step that can be used in upsizing transistors. In particular, there can be one or more rules defining a gate upsize step defining a delta gate-length by which a transistor can be upsized for a particular process technology.

Path module 160 is configured to identify each rail-to-rail path in a cell 120. A rail-to-rail path can be a path between a supply source and ground including at least one transistor.

Transistor set module 165 can be configured to select a minimum set of transistors that includes all rail-to-rail paths in a cell based on rules base 180. Transistor set module 165 can also be configured to select additional transistors to upsize based on rules base 180. The selected minimum set of transistors can include transistors that have the highest impact on leakage or the lowest impact on a change of delay and area if the gate lengths of each of the selected minimum set of transistors are upsized.

Layout modification module 185 is configured to create a low-leakage version of a cell by upsizing (i.e. upsizing the gate length of a transistor) each of a set of transistors by an upsize distance. Layout modification module 185 can also be configured to save a low-leakage version of the cell and check a low-leakage version of a cell based on rules of rules base 180. Layout modification module 185 can receive layout view 124 (in GDSII or other formats) of the cells, design rules database, along with the transistors identified for upsizing. This module then performs the upsizing of the selected transistors within the design rule compliance. In an embodiment, layout modification module 185 can automatically or manually perform the upsizing of the selected transistors.

Accordingly, a cell 120 of a cell library 115 on library system 110 can be received at leakage reduction module 154 through interface 152. Leakage reduction module 154 can create a low-leakage version of the cell 120, which can then be provided back to library system 110 through the interface 152. The low-leakage version of the cell can then be stored on the library system 110 (for example, to replace or supplement original cell 120 in cell library 115), where it can be used in the design of one or more circuits. Additionally, a low-leakage version of cell library 115 can be created by using leakage reduction module 154 to create low-leakage versions of all cells 120 within the cell library 115. This low-leakage version of the cell library 115 can be stored on library system 110 to replace or supplement the original call library 115, such that it can be utilized in the design of one or more integrated circuits, processors or systems-on-a-chip by multiple designers.

Figure 2:
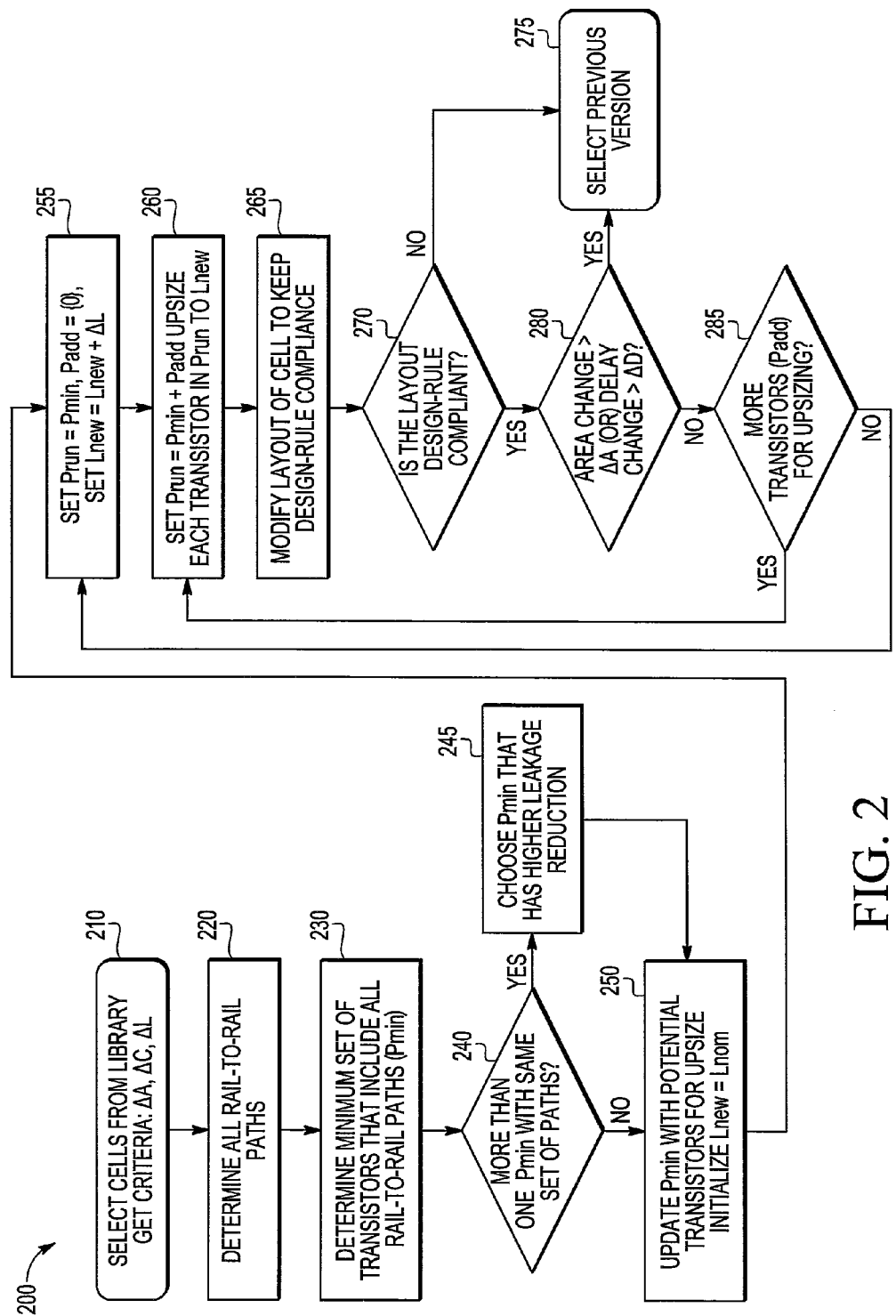
FIG. 2 illustrates one embodiment of a method for creating a low-leakage version of a cell.

Turning now to FIG. 2, an embodiment of a method 200 for reducing leakage within a cell is depicted. At step 210, a cell is selected from a cell library to create a low-leakage version of that cell. The criteria to be utilized in creating the low-leakage version of the cell can also be obtained. The criteria can include a delay budget ($\Delta D$), an area budget ($\Delta A$), and a gate upsize step ($\Delta L$) associated with the process technology of the cell.

At step 220, all of the rail-to-rail paths including transistors within the cell are determined. A rail-to-rail path is a path between a supply source and ground that includes one or more transistors. Once all the rail-to-rail paths within the cell are determined, at step 230 a minimum set of transistors ($P_{min}$) that includes all of the rail-to-rail paths is determined. This minimum set of transistors ($P_{min}$) is the minimum number of transistors that are coupled to a rail of the cell and, if removed, would result in no rail-to-rail path existing in the cell. In certain cells there can be multiple transistors that are coupled to a rail of the cell and where the removal of any one of those transistors would result in the same rail-to-rail path(s) being removed from the cell. Initially when determining $P_{min}$ these multiple transistors are all added to $P_{min}$.

At step 240, then, it is determined if there are multiple transistors in the minimum set of transistors ($P_{min}$) where the removal of each one of those multiple transistors would remove the same rail-to-rail path(s) from the cell. If it is determined at step 240 that there is more than one transistor in the minimum set of transistors ($P_{min}$), where the removal of those transistors would remove the same rail-to-rail path(s) from the cell, the transistor of those multiple transistors that would have the higher leakage reduction if upsized can be selected for inclusion in the minimum set of transistors ($P_{min}$) at step 245. The determination of which transistor of the multiple transistors that would have the higher leakage current reduction can be made, for example, based on leakage information associated with the transistors of the cell in a functional view of the cell or running a simulation using a transistor level netlist of the cell.

At step 250, the minimum set of transistors ($P_{min}$) is updated by removing all of the multiple transistors that were not selected in step 245 from the minimum set of transistors ($P_{min}$). Thus, if there were multiple transistors in the cell where the removal of any one of those transistors would result in the same rail-to-rail path(s) from the cell only the transistor of those multiple transistors that would have the higher leakage reduction will remain in the minimum set of transistors ($P_{min}$) after this step. Additionally, at step 250, the gate-length $L_{new}$ is initialized to $L_{nom}$, a minimal gate-length for the process technology associated with the cell.

Once the minimum set of transistors ($P_{min}$) is finalized, at step 255, the set of transistors to upsize ($P_{run}$) is initialized as the minimum set of transistors ($P_{min}$). A set of additional transistors to upsize ($P_{add}$) is set to empty. A current gate-length after upsizing ($L_{new}$) is set to $L_{new}$, and incremented by the gate upsize step $\Delta L$ determined for the process technology associated with the cell.

At step 260, $P_{run}$ is set as $P_{min}+P_{add}$, and each transistor in $P_{run}$ is upsized by the $L_{new}$ to create a low-leakage version of the cell. Note then, that when creating the initial low-leakage version of the cell only the minimum set of transistors ($P_{min}$) is upsized, and that these transistors are only upsized by the gate upsize step.

At step 265, the layout of the cell is modified to create the low-leakage version of the cell while keeping design rule compliance. Design rule compliance refers to a set of layout rules. These layout rules enable the printability of a circuit's geometry associated with the cell when the cell is fabricated. These rules are technology specific and are defined for each layer in a cell layout.

At step 270, it can be determined if the modified layout of the low-leakage version of the cell is design-rule compliant. If the modified layout of the low-leakage version of the cell is design-rule compliant, at step 280 it can be determined if an area change for the low-leakage version cell is greater than $\Delta A$ or if a delay change of the low-leakage version of the cell is greater than $\Delta D$. It will be noted here, that one, both or neither of the criteria of area or delay may be utilized when creating a low-leakage version of a cell. Thus, in certain embodiments step 280 may not be present, or it may only be determined if an area change for the low-leakage version cell is greater than $\Delta A$ or may only be determined if a delay change of the low-leakage version of the cell is greater than $\Delta D$.

Returning to step 280, if the area change for the cell is not greater than $\Delta A$ and the delay change of the cell is not greater than $\Delta D$, the low-leakage version of the cell can be saved as a previous low-leakage version of the cell.

Additionally, if at step 280 the area change for the cell is not greater than $\Delta A$ or the delay change of the cell is not greater than $\Delta D$, then at 285 it is determined if there are additional transistors $P_{add}$ within the cell that can be upsized. Determining if there are additional transistors to upsize can include determining one or more transistors in each rail-to-rail path of the cell that are coupled to a rail of the cell, and determining if these one or more transistors are already in $P_{run}$. If the one or more transistors of each rail-to-rail path in the cell that are coupled to a rail of the cell are not in $P_{run}$ it can be determined that that there are more transistors for upsizing at step 285, while if the one or more transistors in each rail-to-rail path of the cell that are closest to a rail of the cell are in $P_{run}$ it can be determined that there are no more transistors for upsizing at step 285.

If there are more transistors to upsize at step 285, then at step 260 the additional transistors $P_{add}$ are added to the set of transistors to upsize ($P_{run}$) and each transistor in $P_{run}$ is upsized by $L_{new}$ to create a new low-leakage version of the cell, and the steps 265, 270 and 280 repeated.

If there are no more transistors to upsize at step 285, then at step 255, the set of transistors to upsize ($P_{run}$) is set as $P_{min}$. The set of additional transistors to upsize ($P_{add}$) is set to empty. The current upsize distance ($L_{new}$) is then set to the current upsize distance plus the gate upsize step $\Delta L$ determined for the process technology associated with the cell. A low-leakage version of the cell is then created at step 260, and steps 265, 270 and 280 repeated for this new low-leakage version of the cell.

Referring now to steps 270 and 280, if at any point a low-leakage version of the cell is not design rule compliant at step 270, an area change for the low-leakage version cell is greater than $\Delta A$ or a delay change of the low-leakage version of the cell is greater than $\Delta D$, at step 280, the previous low-leakage version of the cell is selected as the low-leakage version of the cell at step 275. In this manner, a cell can be transformed to create a low-leakage version of the cell that conforms to an area budget, a delay budget and remains design rule compliant, while still achieving the maximum leakage reduction possible with such constraints.

Moving now to FIG. 3, an example of the application of an embodiment of the systems and methods disclosed herein to a particular cell is depicted. Cell 300 is a two input NAND and has transistors 310, 315, 317 and 320 with length L, inputs 306 and 308, source 302, ground 304, and output 309.

It can be desired to create a low-leakage version of cell 300. Initially, all of the rail-to-rail paths including transistors within the cell 300 can be determined as paths 330 and 340. Rail-to-rail path 330 includes transistors 315, 317 and 320 while rail-to-rail path 340 includes transistors 310, 317 and 320. Then, a minimum set of transistors that are coupled to a rail of the cell 300 and, if removed, would result in no rail-to-rail path existing in the cell 300 can be determined. Transistor 310 is a member of rail-to-rail path 340, is coupled to source 302 and if removed would result in the removal of rail-to-rail path 340 from cell 300. Similarly, transistor 315 is a member of rail-to-rail path 330, is coupled to source 302 and if removed would result in the removal of rail-to-rail path 330 from cell 300. Transistor 320 is a member of both rail-to-rail paths 330 and 340, is coupled to ground 304 and if removed would result in the removal of both rail-to-rail paths 330, 340 from cell 300. Accordingly, as the minimum set of transistors that are coupled to a rail of the cell 300 and, if removed, would result in no rail-to-rail path existing in the cell 300 comprises transistor 320, it can be determined that the minimum set of transistors includes only transistor 320. While transistor 317 is a member of both rail-to-rail path 330 and rail-to-rail path 340, and if removed would result in the removal of both rail-to-rail paths 330, 340 from cell 300, transistor 317 will not be selected for inclusion in the minimum set of transistors as it is not coupled to source 302 or ground 304.

Thus, as depicted in FIG. 4, a low-leakage version 400 of cell 300 can be created by upsizing transistor 320 of cell 300 by ΔL to gate-length, $L_{new}$ to create cell 400 with upsized transistor 410. Assume, for purposes of this example, that the low-leakage version of the cell with upsized transistor 410 is design rule complaint, and that an area change of the cell 400 is not greater than an area budget and the delay change of the cell 400 is not greater than a delay budget. Accordingly, it can then be determined if there are additional transistors within the cell 400 that can be upsized.

Determining if there are additional transistors to upsize can include determining one or more transistors in each rail-to-rail path of the cell that are coupled to a rail of the cell. As such, transistors 310 and 315 can be determined as additional transistors within the cell that can be upsized. The additional transistors 310, 315 can be added to the set of transistors to upsize and each transistor in the set can be upsized to $L_{new}$ to create a new low-leakage version of the cell 500 with transistors 510 and 515, as depicted in FIG. 5. It will be noted that while in the embodiment depicted each transistor is upsized to $L_{new}$ in other embodiments, the transistors may be upsized by a different amount and that in some embodiments the amount by which each transistor is upsized may differ.

Figure 6:
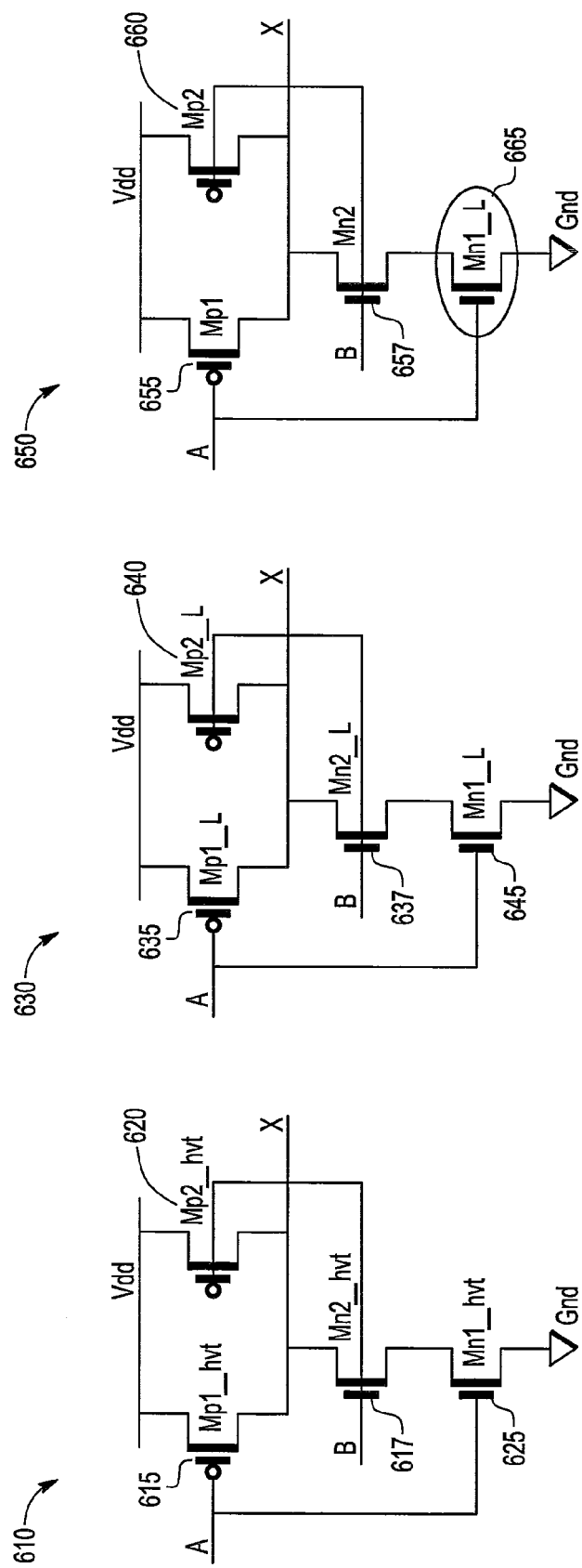
FIG. 6 illustrates embodiments of different cells.

Moving now to FIG. 6, different low leakage versions 610, 630, 650 of the same cell with four transistors are depicted. As discussed above, it is desired for cells to have a lower delay, lower leakage and a smaller area.

Cell 610 depicts a low-leakage version of a cell where each transistor 615, 617, 620, 625 within the cell 610 has a high threshold-voltage (HVT). By increasing the threshold-voltage of each of the transistors 615, 617, 620, 625 within cell 610 it is possible to improve the leakage of the cell 610 while not increasing the area of the cell 610. However, by increasing the threshold-voltage of each transistor 615, 617, 620, 625 the delay of the cell can significantly increase. In one embodiment, a cell with each transistor having a HVT compared to the standard cell from which it was created can have a delay increase of approximately 80% and a leakage reduced by a factor of 0.078.

Cell 630 depicts a cell where each transistor 635, 637, 640, 645 is upsized to have a gate length L. By increasing the gate length of each transistor 635, 637, 640, 645 within cell 630 it can be possible to create a cell with lower leakage. However, a cell with upsized transistors 635, 637, 640, 645 will have an increased delay and area compared with the standard cell using nominal threshold-voltage (SVT) from which it was created. More specifically, when compared to a standard version of the cell, cell 630 can have an 11% increase in delay, the area of the cell 630 can be increased by a factor of 1.6, and the leakage of the cell 630 can be reduced by a factor of 0.78.

Cell 650 depicts an embodiment of a low-leakage version of a standard cell where only a minimum set of transistors that include all rail-to-rail paths have an extended gate length L. As depicted in cell 650, there are two rail-to-rail paths in cell 650, and transistor 665 is along both paths. The minimum set of transistors that include each rail-to-rail path includes only transistor 665, and transistor 665 can be upsized to have a gate length L. By only transistor 665 having upsized gate length L, the leakage of the cell 650 can be reduced while keeping the area constant and only nominally increasing the delay. More specifically, when compared to a standard SVT cell, cell 650 can have a 2% increase in delay, the area of the cell can be maintained, and the leakage of the cell can be reduced by a factor of 0.88. As can be seen then, in comparison with cells 610 and 630, a low-leakage version of a cell created using embodiments as depicted herein can have significant advantages, including reduced delay and little or no increase in the area relative to the standard cell, while achieving similar reduction in leakage to other methods.

Figure 7:
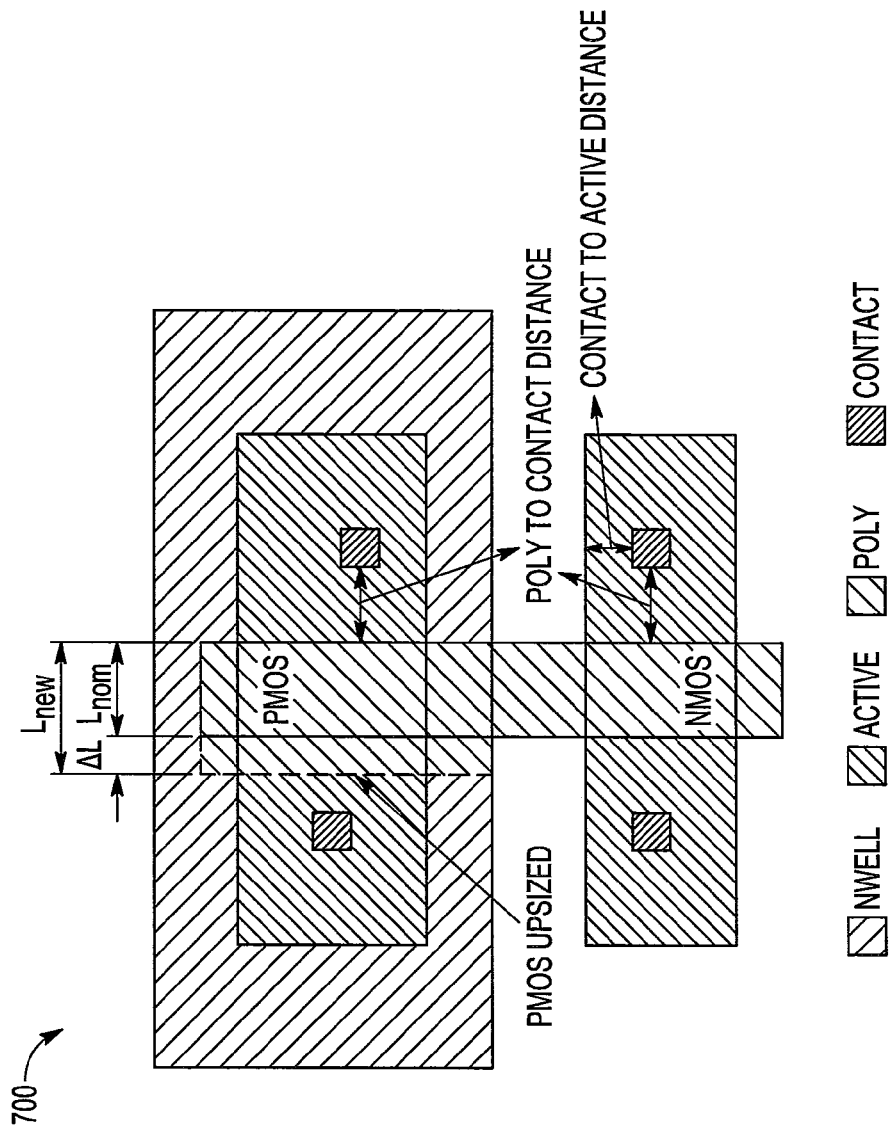
FIG. 7 illustrates one embodiment of a design rule.

FIG. 7 illustrates one embodiment of design rules for a cell 700. Cell 700 can include design rules for two geometries, namely, poly-to-contact distance and contact-to-active distance. Each technology can have a minimum value set for poly-to-contact distance as one of the design rules. If a transistor is upsized from $L_{nom}$ to $L_{nom}+\Delta L$, for example, the minimum poly-to-contact distance design rule may be violated. If a design rule is violated, the layout of the cell 700 may then need to be modified so that the cell 700 is design rule compliant. For example, a cell 700 may become design rule compliant by moving the contacts away from the poly, such that it is design rule compliant in accordance with the minimum poly-to-contact distance. There can be other design rules that are violated as well when upsizing one or more transistors in a cell. The layout of the cell may then need to be modified using the layout modification module 185 to ensure design rule compliance with each of design rules. Design rule compliance can be accomplished automatically using design rules 128 associated with the cell.

Embodiments as described herein can thus offer a number of advantages by reducing the leakage of a cell while maintaining design rule compliance for area and delay of the cell. The usage of cells can dictate that the cells cannot be increased in area, and systems and methods that require upsizing each transistor within a cell will not meet the budgeted area for the cell. By selecting a minimum set of transistors to be upsized, there is an increased chance that the cell will be within an area constraint of the cell. By selecting only a minimum set of transistors to be upsized, the delay within the cell can only be increased by a minimal amount, and thus the performance of the cell will not be decreased or impaired with respect to delay.

Using embodiments of the systems and methods herein low-leakage versions of cells or cell libraries can be created or any combination thereof. System and methods as disclosed herein can also be used to refine existing cells and/or entire libraries to include low leakage versions of the cells already within the library.

As discussed, then, embodiments as described herein provide systems and methods for leakage reduction within a cell. According to one embodiment, a system can include an interface module configured to receive a cell from the library system, wherein the cell comprises information describing one or more transistors and how the one or more transistors are coupled, a path module executing on the processor and configured to identify each rail-to-rail path in the cell, a transistor set module executing on the processor and configured to select one or more of the one or more transistors of the cell that are coupled to a rail of the cell and, if removed, no rail-to-rail path would exist in the cell and a layout modification module executing on the processor and configured to transform the cell by upsizing a gate length of each transistor of the selected transistors to create a low-leakage version of the cell and store the low-leakage version of the cell in a memory coupled to the layout modification module. A circuit embodying the cell may then be created.

Other embodiments may identify each rail-to-rail path in a cell, wherein the cell comprises information describing one or more transistors and how the one or more transistors are coupled; identify each rail-to-rail path in a cell, wherein the cell comprises information describing one or more transistors and how the one or more transistors are coupled; identify one or more of the one or more transistors described by the information of the cell that are directly coupled to a rail of the cell and if each identified transistor were removed no rail-to-rail path exists in the cell; and modify the information of the cell describing each identified transistor to upsize the gate length of each identified transistor to create a low-leakage version of the cell.

According to another embodiment, each rail-to-rail path in a cell may be identified, wherein the cell comprises information describing one or more transistors and how the one or more transistors are coupled; one or more of the one or more transistors of the cell that are directly coupled to a rail of the cell may be identified and if each identified transistor were removed no rail-to-rail path exists in the cell; and the cell modified by upsizing a gate length of each identified transistor to create a low-leakage version of the cell.

The one or more transistors are transistors that if removed would result in no rail-to-rail path existing in the cell.

In certain embodiments, the transistor set module can select one or more transistors based on a rules base, the rules base including rules to determine the minimum set of transistors that will have a highest effect on reducing leakage within the cell. The rules base includes a rule that if multiple transistors can be selected as the one or more transistors, the transistor with higher leakage reduction for a gate upsize step should be selected.

According to an embodiment, the layout modification module can upsize the selected minimum set of transistors if upsizing the selected transistors does not change a delay of the cell to be above a delay budget, and/or if upsizing the selected transistors does not change an area of the cell to be above an area budget.

In another embodiment, the layout modification module can determine if there are additional transistors within the cell that can be upsized.

In another embodiment, the layout modification module can upsize the additional set of transistors if upsizing the additional set of transistors does not change a delay of the cell to be above a delay budget and does not change an area of the cell to be above an area budget. The layout modification module can also upsize the gate length of each of the selected minimum set of transistors by a gate upsize step.

In one embodiment, a low-leakage version of a library may be created by creating a low-leakage version of each of the set of cells of the library.

Although example embodiments are described herein with reference to specific embodiments, various modifications and changes can be made without departing from the scope of the embodiments as set for in the claims below. Accordingly, the specification and figures are to be regarded in an illustrative rather than a restrictive sense, and all such modifications are intended to be included within the scope of the embodiments. Any benefits, advantages, or solutions to problems that are described herein with regard to specific embodiments are not intended to be construed as a critical, required, or essential feature or element of any or all the claims.

Some of the above embodiments, as applicable, can be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that can be used in accordance with the invention. Those skilled in the art will recognize that the boundaries between logic blocks are merely illustrative and that alternative embodiments can merge logic blocks or elements or impose an alternate decomposition of functionality upon various logic blocks. Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "coupled," or in "communication" to each other to achieve the desired functionality.

Also for example, in one embodiment, the illustrated elements of system 100 can be located on a single computing device or multiple distributed or interconnected computer devices. Additionally, not all the components of system 100 are present in certain embodiments. For example, library system 110 may not be present in certain embodiments and in such cases, a library can be generated for leakage reduction system 150, can be provided using a computer readable medium, can be accessed at another location by leakage reduction system 150 or can be obtained in some other manner entirely.

All or some of the above-discussed embodiments can be implemented with software modules that perform one or more tasks associated with the embodiments. The software modules described may include for example, computer-readable storage media, or other media on other computer systems where the memory may include the instructions for performing the tasks or functions. Such computer readable storage media can be permanently, removably or remotely coupled to a data processing system. The computer-readable storage media may include non-transitory computer readable storage media, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, and the like. Other new and various types of non-transitory computer-readable storage media can be used to store the modules discussed herein. Non-transitory computer readable storage media include all computer-readable media except for a transitory, propagating signal.

In one embodiment, system 100 can be data or system stored in a computer system such as a personal computer system. Other embodiments may include different types of computer systems. Computer systems are information handling systems which can be designed to give independent computing power to one or more users. Computer systems can be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although embodiments described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

What is claimed is:

1. A cell leakage reduction system communicatively coupled to a library system configured to store one or more cells, the cell leakage system comprising:
    a processor;
    an interface module configured to receive a cell from the library system, wherein the cell comprises information describing one or more transistors and how the one or more transistors are coupled;
    a path module executing on the processor and configured to identify each rail-to-rail path in the cell;
    a transistor set module executing on the processor and configured to select one or more of the one or more transistors of the cell that are coupled to a rail of the cell and, if removed, no rail-to-rail path would exist in the cell, wherein the selected transistors are a minimum number of transistors that if removed result in no rail-to-rail path exists in the cell; and
    a layout modification module executing on the processor and configured to transform the cell by upsizing a gate length of each transistor of the selected transistors to create a low-leakage version of the cell and store the low-leakage version of the cell in a memory coupled to the layout modification module, wherein the layout modification module is further configured to determine if there are additional transistors within the cell that can be upsized where the additional transistors are not within the selected transistors and upsize the selected transistors if upsizing the selected transistors does not change a delay of the cell to be above a delay budget or does not change an area of the cell to be above an area budget.

2. The system of claim 1, wherein the transistor set module is further configured to select the selected transistors using one or more rules to determine a transistor that has a highest effect on reducing leakage within the cell.

3. The system of claim 1, wherein the layout modification module is further configured to upsize the additional transistors if upsizing the additional transistors does not change a delay of the cell to be above a delay budget and does not change an area of the cell to be above an area budget.

4. The system of claim 1, wherein the layout modification module is further configured to upsize the gate length of each transistor of the selected transistors by a gate upsize step.

5. A cell leakage reduction method being performed on a computing device including a processor, comprising:
    identifying each rail-to-rail path in a cell, wherein the cell comprises information describing one or more transistors and how the one or more transistors are coupled;
    identifying one or more of the one or more transistors described by the information of the cell that are directly coupled to a rail of the cell and if each identified transistor were removed no rail-to-rail path exists in the cell, wherein the identified transistors described by the information of the cell comprise a minimum number of transistors that if removed no rail-to-rail path exists in the cell;
    modifying the information of the cell describing each identified transistor to upsize the gate length of each identified transistor to create a low-leakage version of the cell;
    determining if there are additional transistors described by the information of the cell that can be upsized where the additional transistors are not within the identified transistors; and
    modifying the information of the cell describing each additional transistor to upsize the additional transistors if upsizing the additional transistors does not change a delay of the cell to be above a delay budget or does not change an area of the cell to be above an area budget.

6. The method of claim 5, wherein the identifying of the one or more transistors uses one or more rules to determine a transistor described by the information of the cell that has a highest effect on reducing leakage within the cell.

7. The method of claim 5, wherein the additional transistors are upsized by modifying the information of the cell describing each additional transistor if upsizing the additional transistors does not change a delay of the cell to be above a delay budget and does not change an area of the cell to be above an area budget.

8. The method of claim 5, wherein the upsizing includes upsizing the gate length of each of the identified transistors by a gate upsize step.

9. The method of claim 5, further comprising creating a circuit embodying the low-leakage version of the cell.

10. The method of claim 5, wherein the cell is one of a set of cells of a library and the method further comprises creating a low-leakage version of the library.

11. The method of claim 10, wherein creating the low-leakage version of the library comprises creating a low-leakage version of each cell of the set of cells of the library.

12. A non-transitory computer readable storage medium, the computer readable storage medium storing instructions executable by one or more processors, the instructions configured to:
- identify each rail-to-rail path in a cell, wherein the cell comprises information describing one or more transistors and how the one or more transistors are coupled;
- identify one or more of the one or more transistors described by the information of the cell that are directly coupled to a rail of the cell and if each identified transistor were removed no rail-to-rail path exists in the cell, wherein the identified transistors are a minimum number of transistors that if removed result in no rail-to-rail path exists in the cell;
- modify the information of the cell describing each identified transistor to upsize the gate length of each identified transistor to create a low-leakage version of the cell,
- determine if there are additional transistors described by the information of the cell that can be upsized where the additional transistors are not within the identified transistors; and
- modify the information of the cell describing each additional transistor to upsize the additional transistors if upsizing the additional transistors does not change a delay of the cell to be above a delay budget or does not change an area of the cell to be above an area budget.

13. The computer readable storage medium of claim 12, wherein the identifying of the one or more transistors uses one or more rules to determine a transistor described by the information of the cell that has a highest effect on reducing leakage within the cell.

14. The computer readable storage medium of claim 12, wherein the additional transistors are upsized by modifying the information of the cell describing each additional transistor if upsizing the additional transistors does not change a delay of the cell to be above a delay budget and does not change an area of the cell to be above an area budget.

15. The computer readable storage medium of claim 12, wherein the upsizing includes upsizing the gate length of each of the identified transistors by a gate upsize step.

16. The computer readable storage medium of claim 12, further comprising creating a circuit embodying the low-leakage version of the cell.

17. The computer readable storage medium of claim 12, wherein the cell is one of a set of cells of a library and the method further comprises creating a low-leakage version of the library.

18. The computer readable storage medium of claim 17, wherein creating the low-leakage version of the library comprises creating a low-leakage version of each cell of the set of cells of the library.

19. The system of claim 1, wherein a circuit embodying the low-leakage version of the cell is created.

20. The system of claim 1, wherein the cell is one of a set of cells of a library and the layout modification module is further configured to create a low-leakage version of the library.

* * * * *